United States Patent [19]

Haganuma

[11] Patent Number: 5,489,895
[45] Date of Patent: Feb. 6, 1996

[54] DATA COMMUNICATION APPARATUS WITH OPERATION-STOP FUNCTION

[75] Inventor: Tomoyuki Haganuma, Yokohama, Japan

[73] Assignee: Canon Kabushiki Kaisha, Tokyo, Japan

[21] Appl. No.: 263,405

[22] Filed: Jun. 21, 1994

Related U.S. Application Data

[63] Continuation of Ser. No. 944,748, Sep. 14, 1992, abandoned, which is a continuation of Ser. No. 633,203, Dec. 31, 1990, abandoned, which is a continuation of Ser. No. 192,960, May 12, 1988, abandoned.

[30] Foreign Application Priority Data

May 15, 1987 [JP] Japan .................................. 62-118514
May 19, 1987 [JP] Japan .................................. 62-122093

[51] Int. Cl.⁶ ........................................ H04Q 3/00
[52] U.S. Cl. ........................ 340/825.51; 355/204
[58] Field of Search ................. 340/825.8, 825.51, 340/825.06, 825.17, 825.07, 310 R, 310 A; 84/DIG. 12; 370/53; 341/23; 355/204–209

[56] References Cited

U.S. PATENT DOCUMENTS

| | | | |
|---|---|---|---|
| 3,358,068 | 12/1967 | Campbell | 84/1.03 X |
| 4,145,735 | 3/1979 | Soga | 340/825.51 X |
| 4,156,866 | 5/1979 | Miller | 340/825.06 X |
| 4,174,064 | 11/1979 | Pratt | 340/825.06 X |
| 4,185,272 | 1/1980 | Feiker | 340/310 R X |
| 4,200,862 | 4/1980 | Campbell et al. | 340/310 A |
| 4,418,333 | 11/1983 | Schwarzbach et al. | 340/825.07 X |
| 4,513,284 | 4/1985 | Right | 340/825.51 |
| 4,535,332 | 8/1985 | Miller et al. | 340/825.06 |
| 4,608,561 | 8/1986 | Kojima et al. | 340/825.07 X |

OTHER PUBLICATIONS

B. Rorabaugh, "Data Communications", Tab Books, 1985, pp. 117–123.

Primary Examiner—Ulysses Weldon
Attorney, Agent, or Firm—Fitzpatrick, Cella, Harper & Scinto

[57] ABSTRACT

An image communicating apparatus having a key or other device to stop an operation in progress. The apparatus is preferably capable of performing several operations at the same time, and has a stop control which permits an operator to stop only a selected operation from among several which may be going on when the stop device is actuated. The selection is performed, e.g., on the basis of a predetermined stop priority, which may be settable by the operator. The identity of (and if desired other information regarding) the operation to be stopped may be communicated to the operator, e.g., via a display, and the operator may be given an opportunity to confirm that the correct operation is stopped. Also, according to another version of the invention, actuation of the key or other device may stop all on-going operations except for any which have been selected to be exempt from stoppage.

30 Claims, 12 Drawing Sheets

FIG. 2

| OPERATION NUMBER | KINDS OF OPERATION | STOP PRIORITY n | PROHIBIT FROM STOPPING |
|---|---|---|---|
| 1 | COPY | 1 | |
| 2 | STORE TO MEMORY | 2 | |
| 3 | PRINT FROM MEMORY | 3 | |
| 4 | TRANSMITTING | 4 | |
| 5 | RECEIVING | 5 | |
| 6 | POLLING RECEIVING | 6 | |
| 7 | TIMER ACTIVATED TRANSMISSION | 7 | |
| 8 | TIMER ACTIVATED POLLING OPERATION | 8 | |
| 9 | RELAYING OPERATION | 9 | ○ |

FIG. 17

| KINDS OF OPERATION | OPERATION NUMBER n | PROHIBIT FROM STOPPING |
|---|---|---|
| COPY | 1 | |
| STORE TO MEMORY | 2 | |
| PRINT FROM MEMORY | 3 | |
| TRANSMITTING | 4 | |
| RECEIVING | 5 | ○ |
| POLLING RECEIVING | 6 | |
| TIMER ACTIVATED TRANSMISSION | 7 | ○ |
| TIMER ACTIVATED POLLING OPERATION | 8 | ○ |
| RELAYING OPERATION | 9 | ○ |

5,489,895

DATA COMMUNICATION APPARATUS WITH OPERATION-STOP FUNCTION

This application is a continuation, of application Ser. No. 07/944,748 filed Sep. 14, 1992, now abandoned, which is a continuation of application Ser. No. 07/633,203 filed Dec. 31, 1990, abandoned, which is a continuation of application Ser. No. 07/192,960 filed May 12, 1988, abandoned.

BACKGROUND OF THE INVENTION

1. Field of the Invention

The present invention relates to a communication apparatus which has a plurality of operation modes.

2. Description of the Prior Art

Recently, semiconductor memories having greater and greater capacities have become available, and the cost of semiconductor memories has fallen. As a result, a large capacity semiconductor memory can be installed in a communication apparatus, for example, a facsimile apparatus. Further, as a result of this improvement in semiconductor memory capacity and in techniques of communication, it is possible to provide a facsimile apparatus connected to several communication lines and capable of communicating by more than one line at the same time. A facsimile apparatus able to control the receiving of data during copying is also available. However, in such conventional facsimile apparatus, the communicating operations stop when the stop key is depressed. If the stop key is depressed while several communication operations are in progress, all of those communication operations stop at the same time and the apparatus assumes a standby status. In other words, even if the operator wants to stop only one of the operations and not the other(s), all of the operations in progress stop at the same time.

SUMMARY OF THE INVENTION

The present invention overcomes the above described problems by providing a communication apparatus which has control means for controlling a-stop operation.

According to one aspect of the present invention is provided a communication apparatus which has Stop control means for causing a stop operation according to a predetermined priority.

According to another aspect of the present invention is provided a communication apparatus which has means for prohibiting one or more specific operations from stopping, so that a predetermined operation does not stop but continues, even if the stop key is depressed.

According to another aspect of the present invention is provided a communication apparatus having stop control means for stopping a predetermined operation among a plurality of operations which are in progress at the same time.

These and other features, objects and advantages of the present invention will be more fully appreciated from a consideration of the following detailed description of the preferred embodiments, taken in conjunction with the accompanying drawings.

BRIEF DESCRIPTION OF THE DRAWING

FIG. 2 is a table showing an example of the relationship between kinds of operations and stop priorities in the preferred embodiment of the invention;

FIG. 17 is a table showing an example of a relationship between kinds of operations and operation numbers and whether operations are prohibited from stopping or not.

DETAILED DESCRIPTION OF THE PREFERRED EMBODIMENTS

Figure 1:
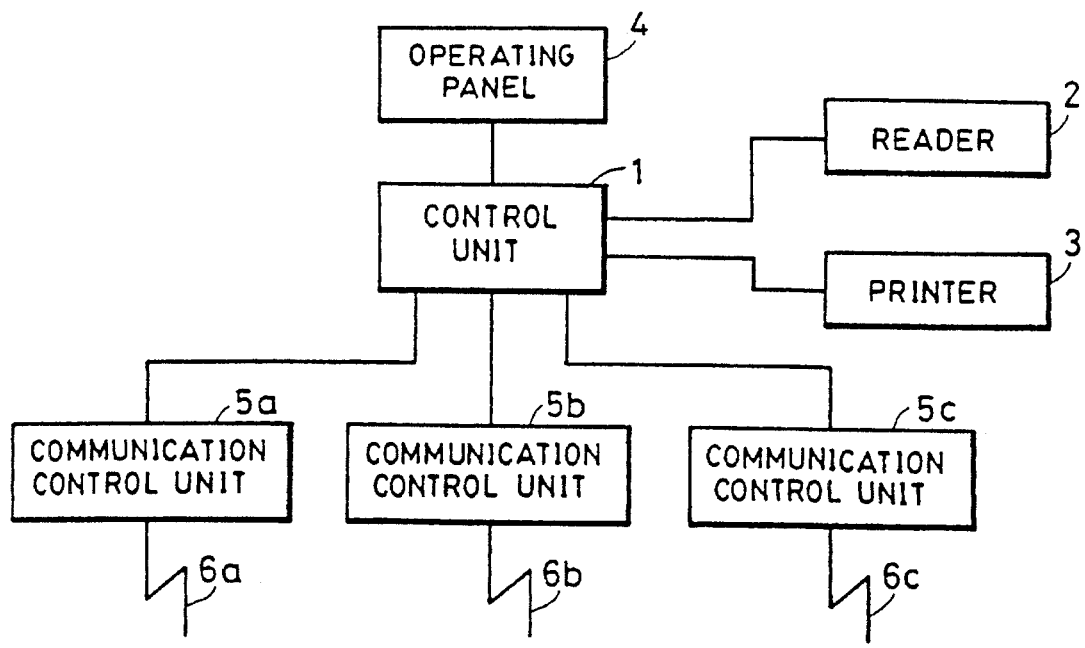
FIG. 1 is a block diagram of the preferred embodiment of the present invention.

FIG. 1 is a block diagram of a facsimile apparatus of an example of the present invention.

In the first preferred embodiment, a control unit 1, a reader 2, a printer 3, an operating panel 4 and communication control units 5a, 5b, 5c are provided. The communication control units 5a, 5b, 5c are respectively connected to communication lines 6a, 6b, 6c, and are able to transmit and to receive independently of each other.

The control unit 1 controls all operations of the apparatus, including the operation of storing image data received via the communication units 5a, 5b, 5c, the operation of outputting to the printer 3, and the operation of transmitting image data read by the reader 2. The control unit 1 also controls the copying operation.

In the copying operation, image data read by the reader 2 is printed or copied by the printer 3. The apparatus shown in FIG. 1 can perform several of the above mentioned operations in parallel.

The control unit 1 operates as a stop control means which controls to stop an on-going operation according to a predetermined stop priority when a stop key 43 (see FIG. 4) is depressed.

An operator can determine the stop priority at will. The stop control means acts to select .the operation to be stopped according to the predetermined priority, and, in this embodiment, also acts to confirm to the operator which operation is to be stopped, and to stop that operation after the confirmation. The stop control means (the control unit 1) also informs the operator what operation has been stopped, when the stop key 43 is depressed.

The control unit 1 also controls to display an indication of which communication lines are in use. The operator can select the communication line whose operation is to be stopped from among the communication lines in use.

FIG. 2 is a table showing an example of the relationship between kinds of operations and the stop priority, and whether specific operations are prohibited from stopping or not. Referring to FIG. 2, the stop priority n is "1" through "9", an operation whose stop priority is n=9 being prohibited from stopping, among all the operations. Therefore, the relaying operation (in this example) is not stopped when the stop key is depressed.

Figure 4:
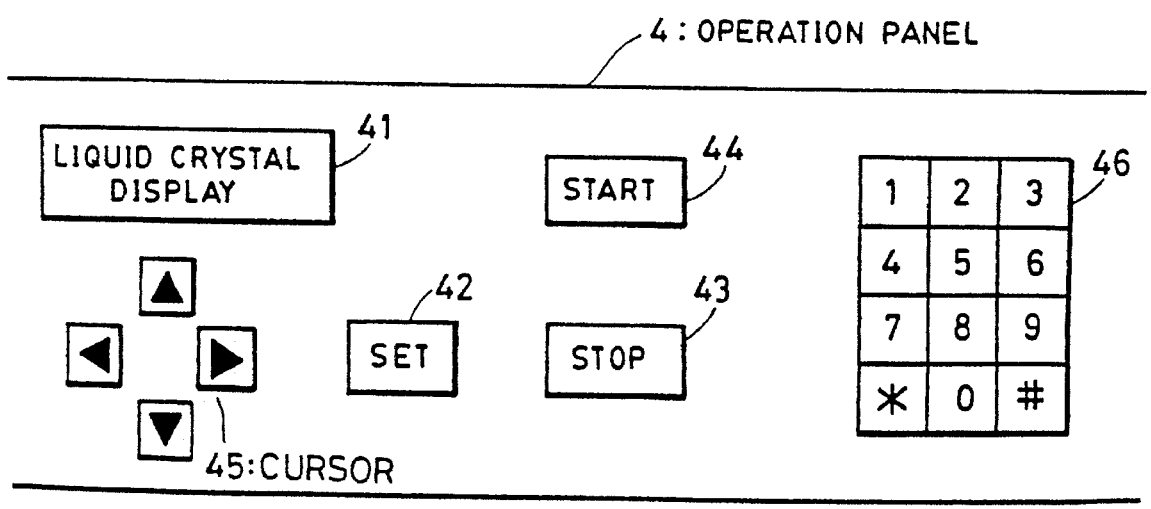
FIG. 4 is a top view of an example of an operational panel.

FIG. 4 shows an operating panel.

The operating panel 4 includes a liquid crystal display unit 41, a set key 42, the stop key 43, a start key 44, cursor keys 45 and numeral keys 46. The stop key 43 is a key for instructing the apparatus to stop an operation. The set key 42 and the cursor keys 45 are for setting the stop priorities and selecting an operation to be prohibited from stopping. Therefore, in an application where the operator is not to be permitted to set the priority nor to select an operation to be prohibited from stopping, the set key 42 and the cursor keys 45 may be omitted.

Figure 3:
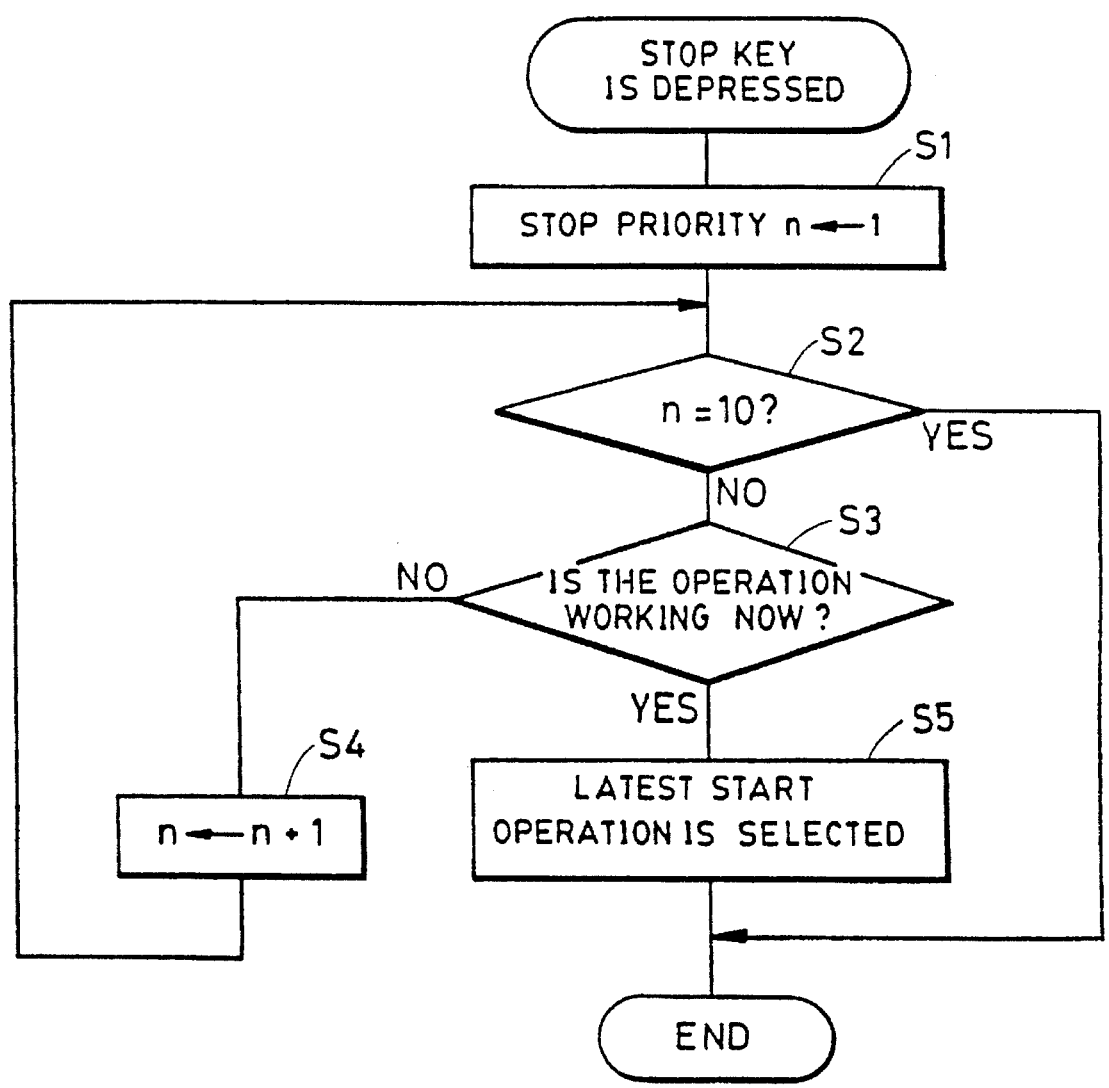
FIG. 3 is a flow chart illustrating the selection of one operation to be stopped.

The apparatus operates as follows. FIG. 3 is a flow chart of the control unit. 1 showing selection of the operation which is to be stopped by depression of the stop key.

Firstly, if both the communication lines 6a and 6b are in use for transmitting image data, the apparatus operates as follows. When the stop key 43 is depressed, in step S1, the stop priority n is preset as "1". In the step S3, a check is made as to whether the operation having stop priority n=1, i.e., the copying operation, is in use or not.

If the copying operation is not in use, the stop priority n is incremented (84). On the other hand, if the copying operation is in use, the copying operation is caused to stop. In the step S5, if the same operations are in use with more than one of the communication lines at the same time, the operation which was most recently started is caused to stop. For example, in a case where the transmitting operations are in use via several communication lines at the same time, the transmitting operation whose transmitting start time is latest is caused to stop. In the step S2, if the stop priority n has reached 10, no operation is in use, and therefore, there is no operation to be stopped. The relay operation designated by the stop priority 9 is prohibited from stopping. Thus, if the stop key 43 is depressed while the relay operation is being operated, the relay operation does not stop, but continues.

Figure 5:
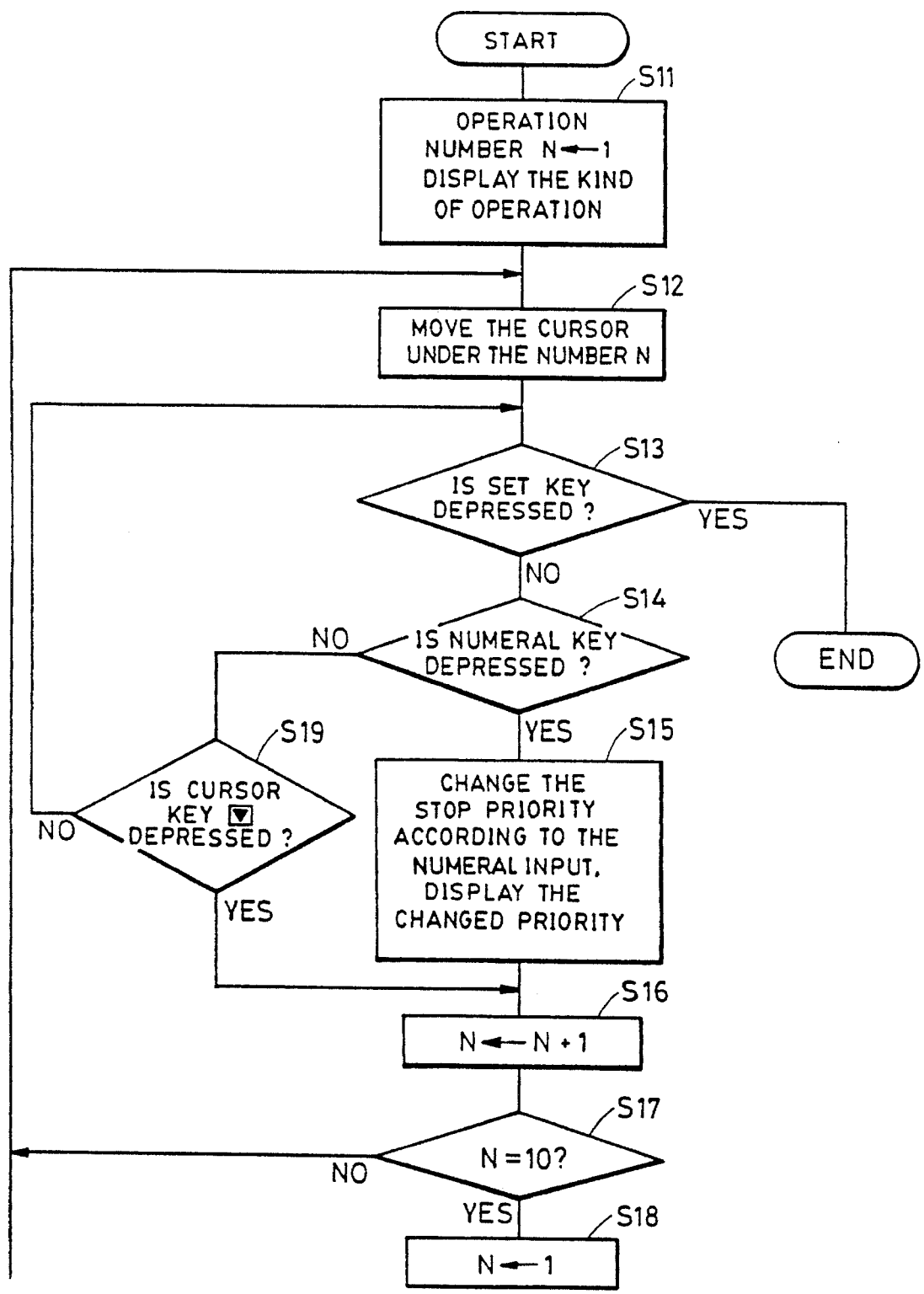
FIG. 5 is a flow chart illustrating the setting of stop priorities.

FIG. 5 shows a flow chart of the control unit 1 for setting the stop priority. The control unit operates as follows.

In the step 11, the number N of operation is preset to 1, and the nature of the all operations is displayed by the liquid crystal display unit 41. The number N is an operation number, but in the initial state the number N coincides with the stop priority n.

In the step S12, a cursor 47 is moved to the position designated by the number N. In this state the cursor 47 is placed adjacent "1".

If the numeral key 46 is depressed, the number N is changed to the stop priority n designated by the numeral key 46 (S14, S15). For instance, if "3" is input by the numeral key 46, "1" is changed to "3".

In the step S16, the number N is incremented. For instance, N="1" becomes N="2". The cursor is moved to the position adjacent "2" in the display unit 41. If, on the other hand, the cursor key 45 is input instead of the numeral key 46, the cursor 47 is just moved to the position adjacent the next number N. If the operation number N has become "10" (817), the number N is reset "1" (S18) and the flow returns to step 812.

As mentioned above, the stop priority is input for each operation designated by N=1 through N=9.

When the set key 42 is depressed, the data of the stop priority input by the numeral key 46 and the cursor key 45 is set in a memory in the control unit 1 (S13).

Figure 6:
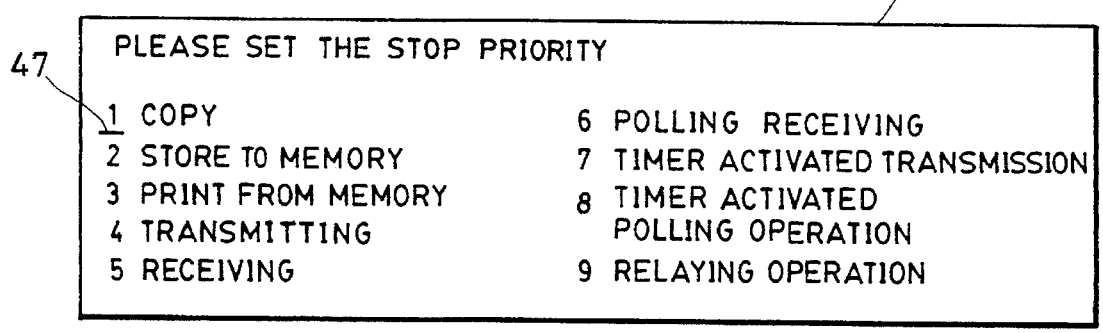
FIG. 6 is an example of menu display which may occur during the setting of stop priorities.

FIG. 6 shows an example of a displaying state of the displaying unit 41 during the above-described setting of the stop priority.

According to the above-mentioned ;embodiment, the stop key 43 is depressed while the facsimile apparatus performs a plurality of operations at the same time, and one of the operations is caused to stop as a consequence. The operation to be stopped is selected according to the priority which is input by the operator, so that the actual stop operation can be done in the same way as in a conventional apparatus which performs a single operation at a time.

Figure 7:
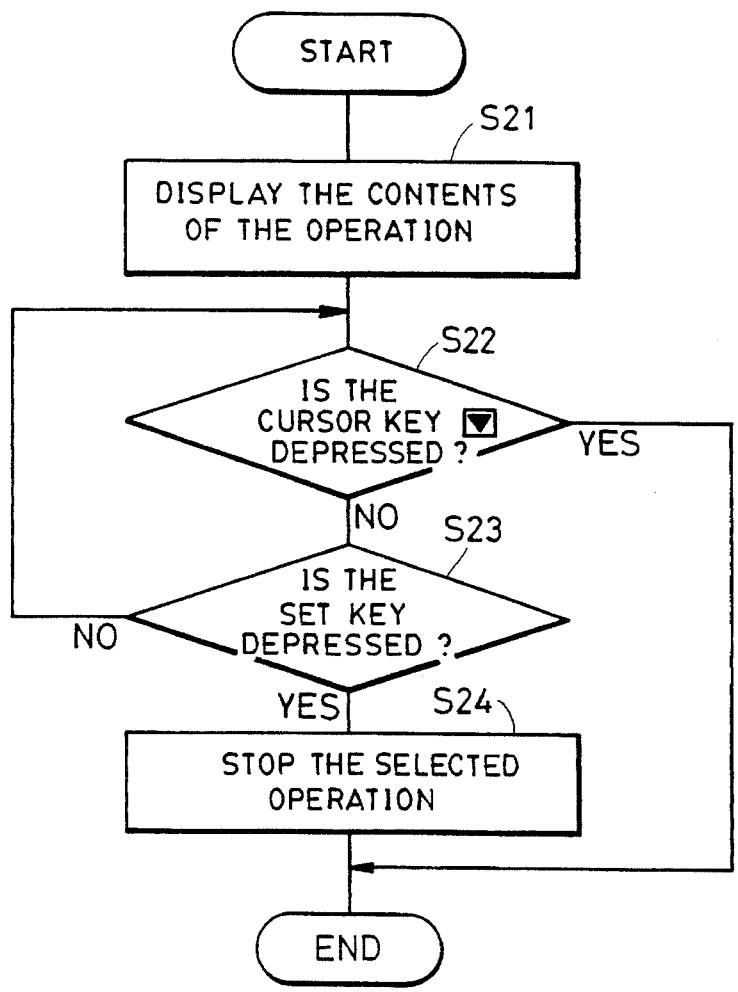
FIG. 7 is a flow chart illustrating confirmation of the stop operation.
Figure 8:
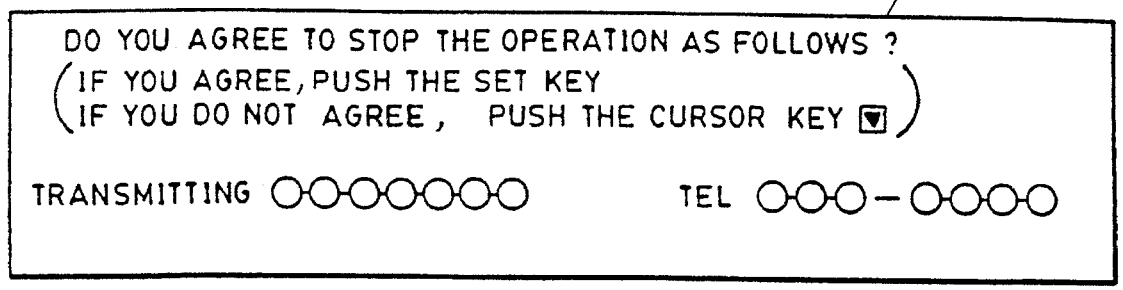
FIG. 8 is an illustration of the display during confirmation of the stop operation.

FIG. 7 shows a flow chart illustrating another preferred embodiment of the present invention. Referring to the operation illustrated in this flow chart, after the stop key is depressed, the identity of the operation to be stopped is displayed on the display 1, so that the operator can confirm what operation is stopped. The flow chart of FIG. 7 continues from the step S5 of FIG. 3. FIG. 8 shows an example of the display 41. After the stop key 43 is depressed, the operation to be stopped is selected in the step 85 of FIG. 3, and then the actual identity (and other information) of the selected operation is displayed on the display 41, as shown in FIG. 8 (S21). For example, the name and the telephone number of the destination station are displayed on the display 41. At this time, if the cursor key 45 is depressed by the operator, the previously-entered order to stop the displayed operation is cancelled (S22). On the other hand, if the set key 42 is depressed, the selected operation is caused to stop (S23, S24).

In the procedure illustrated in FIG. 7 and FIG. 8, the selected operation to be stopped is displayed on the display 41, and the operator can judge whether the selected operation is in fact to be stopped or not, so that an operation the operator wishes to continue does not stop.

Figure 9:
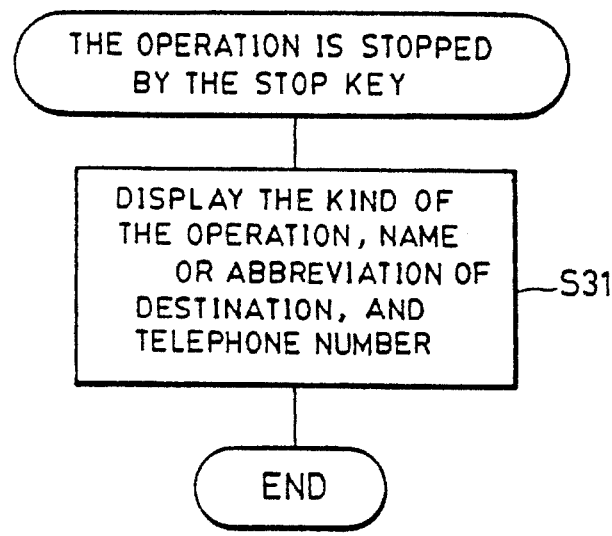
FIG. 9 is a flow chart illustrating the process of displaying a message .about the stopped operation.

FIG. 9 is a flow chart illustrating the procedure for displaying which operation has just finished.

When the stop key 43 is depressed, one of the plural operations in progress at the same time stops. In the step S31, the display 41 is controlled to display:the identity of, and other information regarding, the operation which has just stopped. This information includes the kind of operation, e.g., transmitting, receiving, copying or relaying, an identification of the destination terminal, e.g., a name or an abbreviation and a telephone number, etc.

Figure 10:
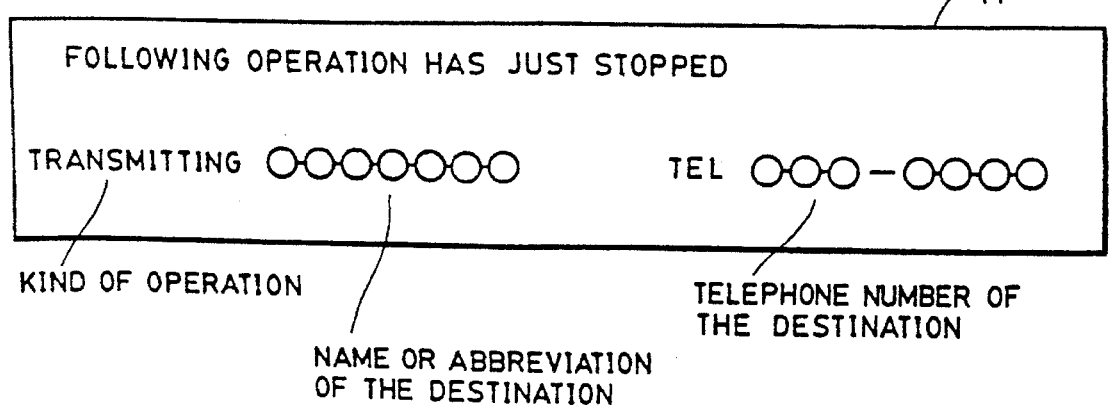
FIG. 10 is an illustration of such a display advising the operator of the stopping operation.

For example, upon the stop key 43 being depressed, the display 41 provides a display like FIG. 10.

As mentioned above, every time the stop key is depressed, the display 41 informs the operator as to the nature of the operation which has just stopped, and thus the operator confirms which operation has stopped. The flow chart of FIG. 9 is continues from step S5 of FIG. 3.

Figure 11A:
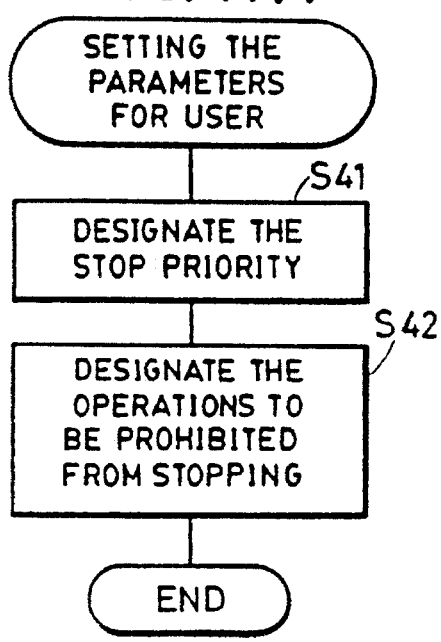
FIGS. 11A and 11B, FIG. 12 and FIG. 13 are flow charts of operations, specifically, or controllable-stop operations.
Figure 11B:
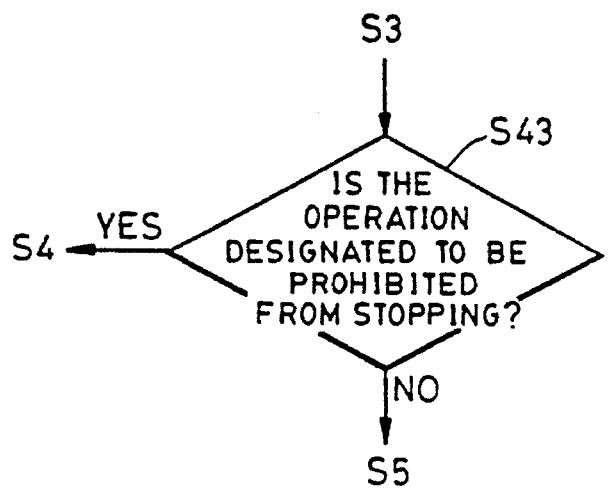

FIG. 11A is a flow chart illustrating a procedure for designating operations to be prohibited from stopping.

In the case of setting parameters or facilities for an operator, first the stop priority is set (S41), and then operations to be prohibited from stopping are designated (S42).

An operation designated to be prohibited from stopping continues in progress, even if the stop key is depressed. In this case, the step 853 of FIG. 12 is included in the procedure shown in FIG. 5.

Figure 12:
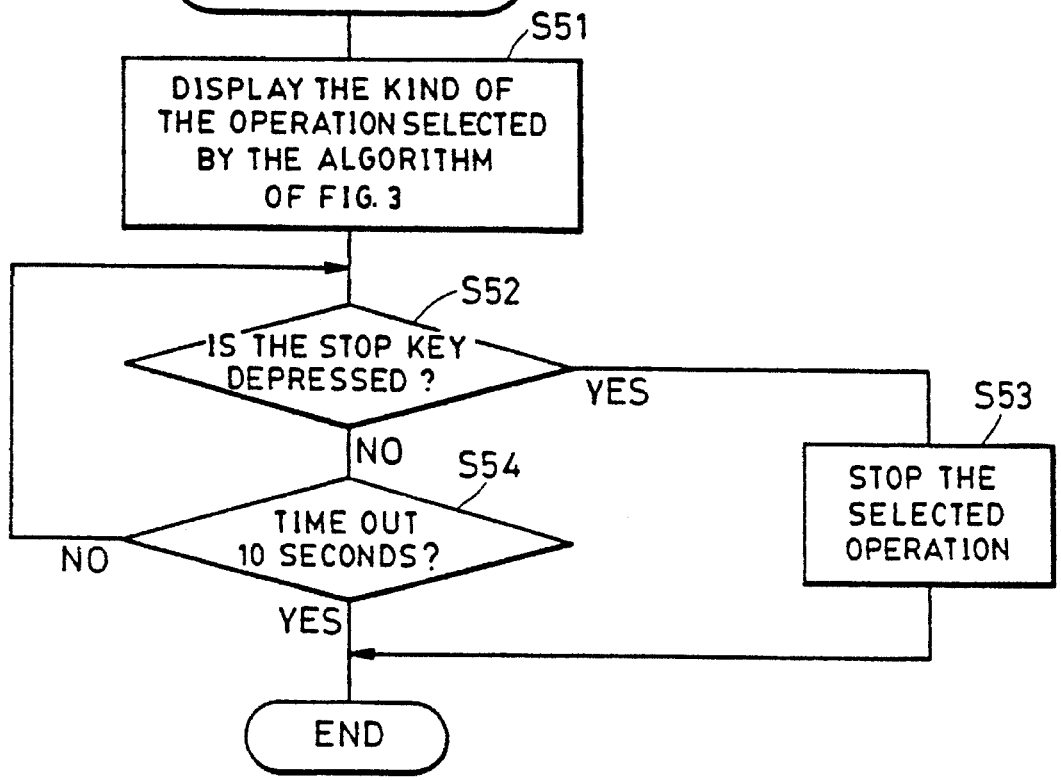

FIG. 12 is another modified flow chart of a control unit 1 showing an operation of stopping when the stop key is depressed.

The process illustrated in the flow chart of FIG. 12 is as follows. In the step S51, the step S1 or S5 in FIG. 3 is performed so that the operation to be stopped is selected, and the display 41 is caused to display the information identifying and describing the selected operation. If the stop key 43 is depressed again after the display 41 starts to display that information, the selected operation stops.

However, unless the stop key 43 is depressed a second time within a predetermined term, e.g., 10 seconds, the selected operation will not stop. In this way, according to the flow chart of FIG. 12, only if the stop key 43 is depressed for more than a predetermined time or is depressed twice, is the selected operation caused to stop.

In other words, the selected operation to be stopped is displayed by depressing the stop key the first time, then the operator confirms the selected operation, and if the operator in fact wishes to stop the selected operation, the operator depresses the stop key 43 again. Only if the operator depresses the stop key two times within the predetermined time does the selected operation stop.

Figures 13, 14:
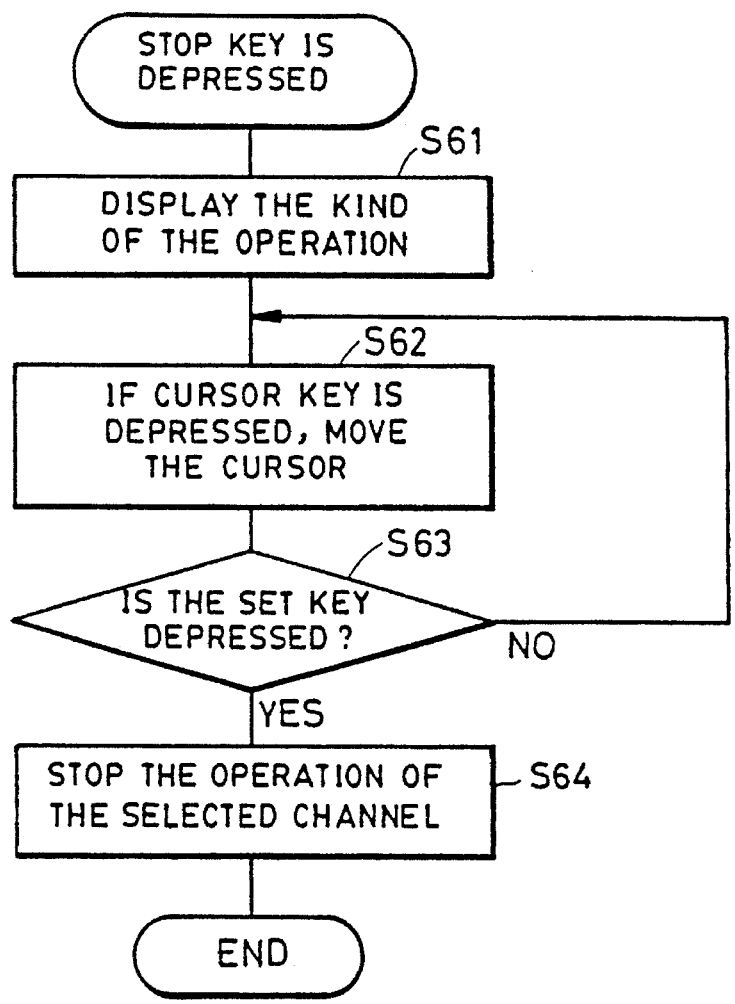
FIG. 14 is an illustration of a display which, in one preferred embodiment, occurs during selection of the stop operation.

FIG. 13 is a flow chart of the operation of the control unit 1 according to another preferred embodiment. In this embodiment the control unit 1 controls the apparatus as follows when the stop key 43 is depressed.

First, the display 41 is caused to display every state of every channel to be selected to stop (S61). For example, the display 41 provides a display like that shown in FIG. 14, on depression of the stop key 43. In this case, the channel 1 shown as 6a. is in use for transmitting, and the channel 2 shown as 6b is in use for receiving. Both of them are displayed as No. 1 and No. 2, respectfully, in FIG. 14. The display 41 also shows "all operations stop" as No. 3. In-this case there are three choices. The operator moves the cursor in order to designate one among the three choices shown as No. 1, 2 or 3 in FIG. 14 (S62). If the operator depresses the set key 42 (S63), the operation designated by the cursor stops (S64).

For example, if the operator wishes to stop the receiving operation of the channel 2, the operator moves the cursor from the position adjacent No. 1 to that adjacent No. 2 by depressing the downward cursor key 45, and then depresses the set key 42. Then the control unit 1 determines that the receiving operation of the channel 6b is to be stopped, generates a stopping command to the communication control unit 2, and thus causes the receiving operation to stop.

The display 41 may display one operating state to be stopped at a time, and the operator changes the display of the operating state by scrolling with the cursor key to find the operating state the operator wishes to stop.

Alternatively, a plurality of LEDs (Light Emitting Diodes) are respectively provided for all channels, and the operator selects the channel to be stopped by depressing keys. That channel's LED light stops when the stop key is depressed.

Figure 15:
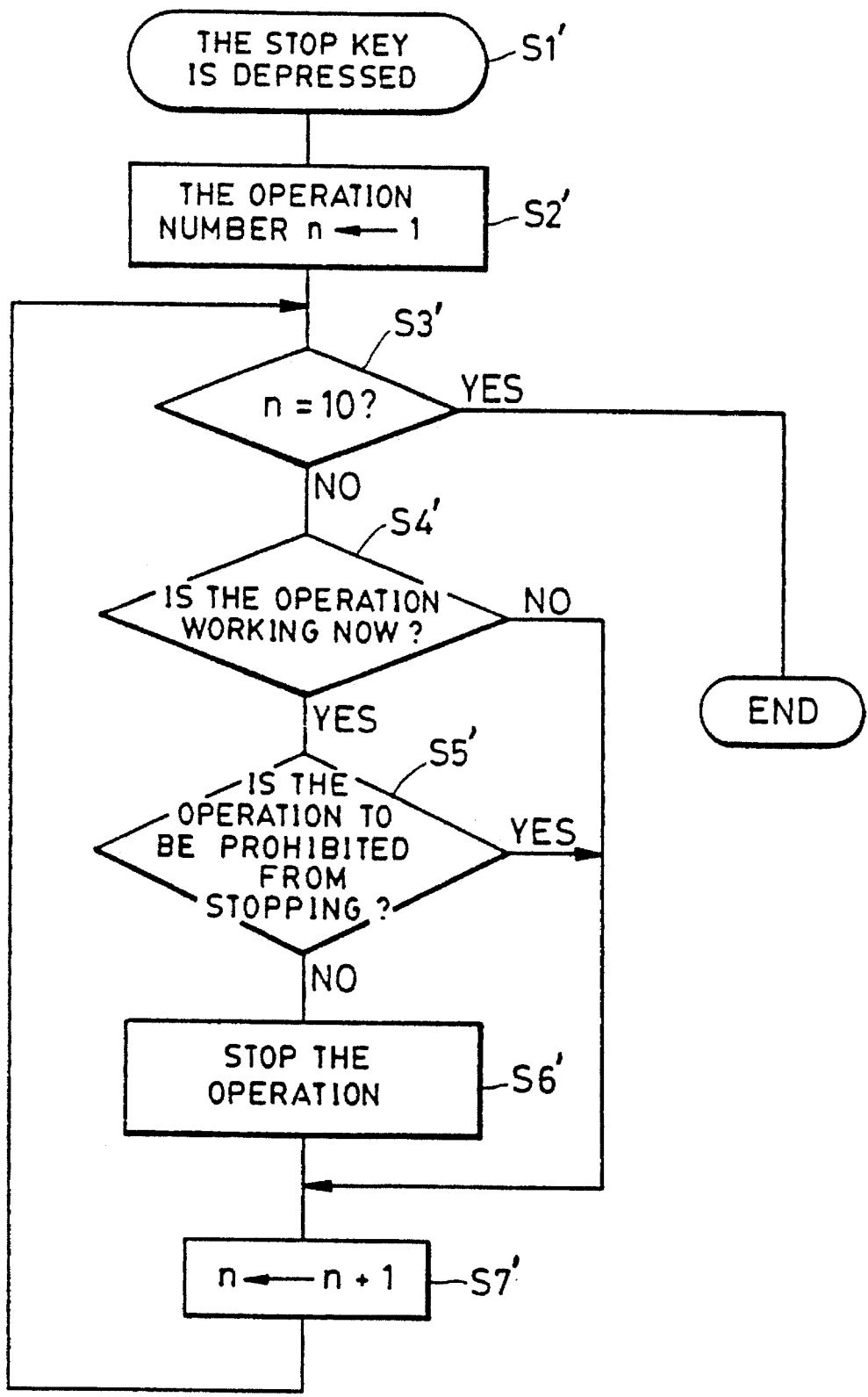
FIG. 15 is a flow chart illustrating the procedure for stopping all operations except for specified operations which are prohibited from stopping.
Figure 16:
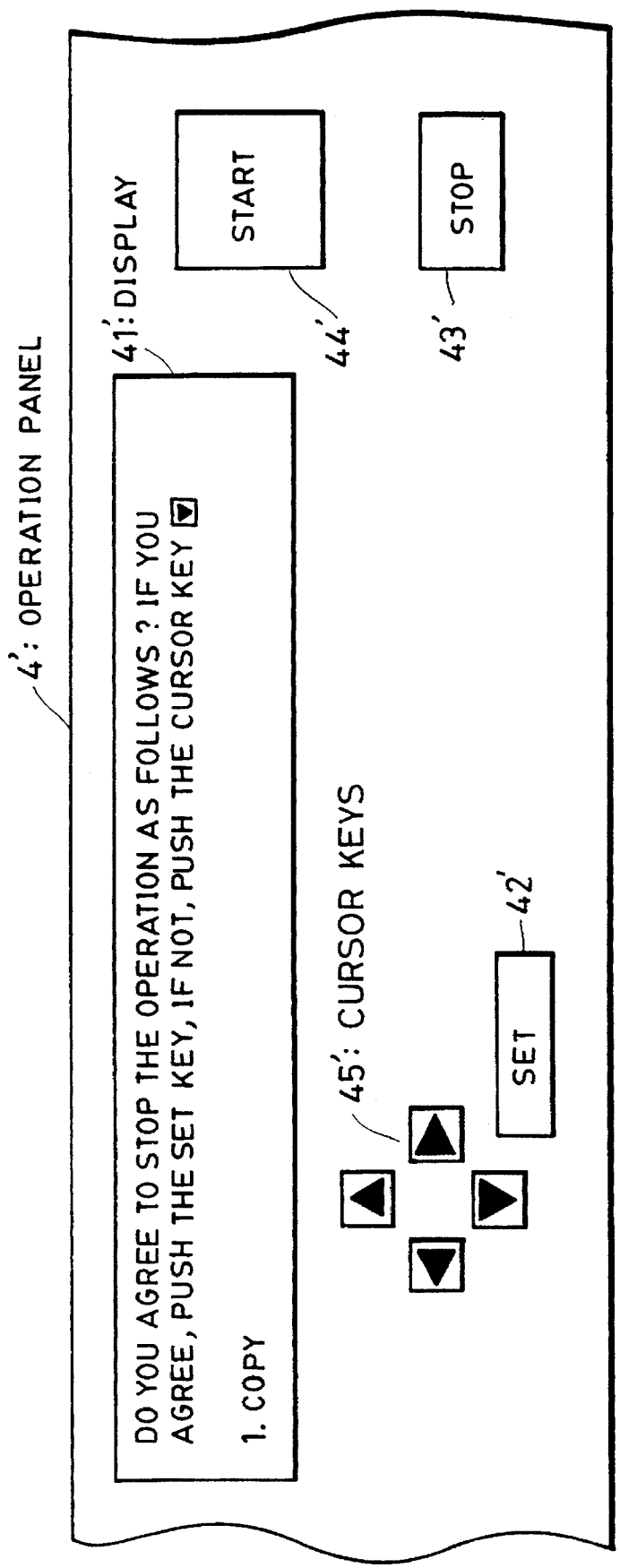
FIG. 16 is a top view of an operation panel.

Another embodiment is shown in FIGS. 15 through 18. FIG. 16 shows an operating panel 4' for inputting data or commands and for displaying conditions of the apparatus. The operating panel 4' includes a liquid crystal display 41', a set key 42', a stop key 43', a start key 44' and a cursor key 45'. The stop key 43' is provided for instructing the apparatus to stop the operation. In an application where the operator is not to be permitted to select the operation(s) to be prohibited from stopping, the set key 42' and the cursor key 45' may be omitted. FIG. 17 is a table showing an example of the relationship between kinds of operations and operation numbers, and whether operations are prohibited from stopping or not.

This embodiment has nine different operations, so that the operation number n has values "1" through "9". Among the nine operations, the operations designated as n= "5", "7", "8" and "9" are prohibited from stopping. Therefore, even if the stop key 43' is depressed, the receiving operation (n=5), timer-activated transmission for transmitting documents to a destination at a preset time (n=7), timer-activated polling for receiving documents from a predetermined terminal at a preset time (n=8), and a relaying operation for relaying from a predetermined terminal to a predetermined destination (n=9) continue.

This embodiment operates as follows. FIG. 15 is a flow chart of the operation of the control unit 1 in FIG. 1. This flow chart shows an operation of the facsimile apparatus when the stop key 43' is depressed.

First, when the stop key 43' is depressed (S1'), "1" is preset as the operation number n (S2'). In the step S3', a determination is made as to whether n=10. Since at this time n=1, the result of the determination is that n is not "10". Then in the step S4', the control unit 1 judges whether the copying operation designated as n=1 is in use or not. If the copying operation is not in use, the program is advanced to the step S7'. On the other hand, if the copying operation is in use, in the step S5' the control unit 1 judges whether the copying operation is designated as an operation to-be prohibited from stopping or not. The copying operation is not an operation so prohibited, and therefore, n is incremented in the step S7', and the steps S3' through S7' are repeated, because other operations may be in use at the same time.

In a case where the operation number is "5", and the receiving operation is in use, the receiving operation continues even though the stop key 43' is depressed. In this fashion, important operations are prohibited from stopping. In other words, the operations not to be stopped continue and are protected from stopping even though the stop key is depressed.

Figure 18:
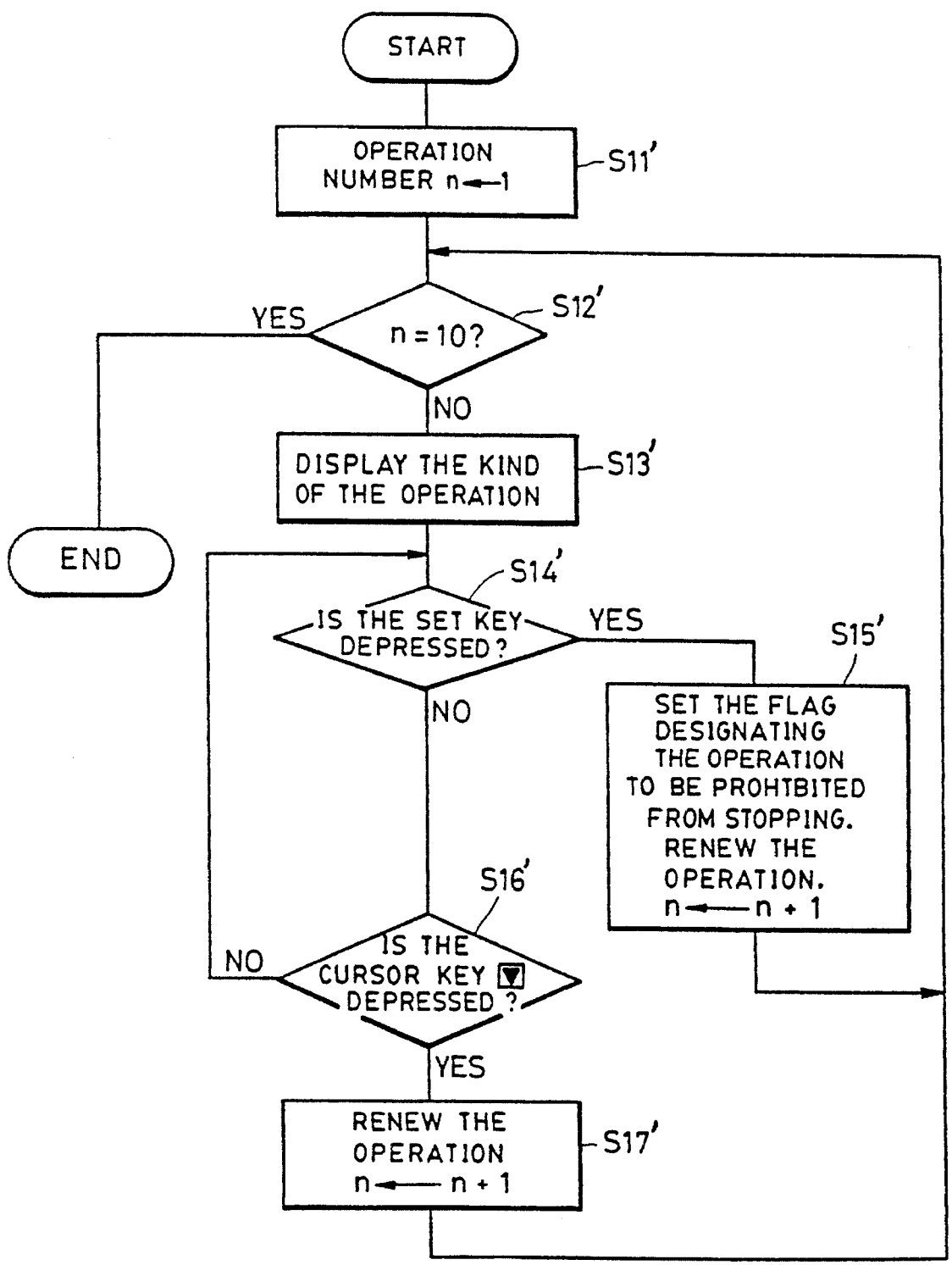
FIG. 18 is a flow chart illustrating the procedure for presetting or selecting the operations to be prohibited from stopping.

FIG. 18 is a flow chart illustrating the presetting or selection of the operations to be prohibited from stopping.

In the step S11', the operation number n is preset to be "1". In the step S13', the display 41' on the operation panel 4' is caused to display the kinds of operation, as shown in FIG. 16. The display 41' displays "Would you like to prohibit stopping the operation as follows?", the kind of the operation ("COPY") and the operation number "1" thereof.

The display 41' also says, e.g., that if the operator wishes to prohibit the copying operation from stopping, the set key 42' must be pressed, and if not, the downward cursor key 45' should be pressed.

When the operator presses the set key 42' (S14'), a flag designating the operation to be prohibited from stopping is set to the copying operation (S15'), and the operation number is incremented.

On the other hand, when the downward cursor key 45' is depressed by the operator (S16'), the operation number is just incremented without the flag being set (S17').

In this way, the operational number n is incremented, and the steps S12' through 817' are repeated. When the number n reaches "10", the presetting operation finishes. According to this aspect of the invention, thus, even though the stop key is depressed, the operation not to be stopped continues.

The invention has been described illustratively with reference to several embodiments thereof, many modifications and variations will now be apparent to those skilled in the art. For example, which these above mentioned embodiments are related to facsimile apparatuses, this invention may be applied to other communication apparatuses.

Especially, the communication apparatus which has more than one operations on-going at the same time, may benefit from the present invention.

Again, while the liquid crystal display is used in these embodiments, other displays, or an acoustic informer, may be used for informing the operator of the information communicated by the LCD's in the foregoing embodiments. Therefore, the scope of the invention is therefore not to be limited by the details of the specific embodiments described herein, but is to be determined by reference to the appended claims.

What is claimed is:

1. An image data communicating apparatus for performing image data transmission to communication lines, image data receiving from communication lines, image data reading, image data storing and image data printing operations, comprising:

an operation controller for concurrently executing a plurality of image data operations among the image data transmission, image data receiving, image data storing, image data reading and image data printing operations of the communication apparatus;

a stop designator for instructing said operation controller to stop one of said plurality of image data operations being executed concurrently when said stop designator is actuated without manually specifying the image data operation to be stopped;

a stop controller for automatically selecting the one image data operation to be stopped when said stop designator is actuated, said stop controller cooperating with said operation controller and said stop designator to stop the one image data operation; and priority setting means for enabling an operator to preset a stop priority of said stop controller, wherein said stop controller selects the one image data operation according to the preset stop priority.

2. A communicating apparatus according to claim 1, wherein said stop controller is so constructed as to be able to request an operator to confirm the identity of the operation to be stopped, and wherein said stop controller has means for receiving such confirmation, and is constructed to stop the operation after the operator provides confirmation.

3. A communicating apparatus according to claim 1, further comprising informing means responsive to stoppage of the operation selected to be stopped, for informing an operator of the identity of the operation which has just been stopped by said stop controller.

4. An image data communicating apparatus for performing image data transmission to communication lines, image data receiving from communication lines, image data reading, image data storing and image data printing operations comprising:

an operation controller for concurrently executing a plurality of image data operations among the image data transmission, image data receiving, image data storing, image data reading and image data printing operations of the communication apparatus, said operation controller being connected to a plurality of communication channels executing communications concurrently;

a stop designator for instructing said operation controller to stop one of said plurality of image data operations being executed concurrently when said stop designator is actuated without manually specifying the image data operation to be stopped; and a stop controller for automatically selecting the one image data operation, the one image data operation having been started later than another of the image data operations being executed concurrently, said stop controller cooperating with said operation controller and said stop designator to stop the one image data operation.

5. A communicating apparatus according to claim 4, further comprising a display arranged for displaying an indication of which of the communication channels are in use when said stop designator instructs said apparatus to stop an operation, and a channel designator, which is for designating a communication channel whose operation is to be stopped, from among the communication channels in use.

6. An image communication apparatus for performing image data transmission to communication lines, image data receiving from communication lines, image data reading, image data storing and image data printing operations, comprising:

an operation controller for executing a plurality of kinds of image data operations of said image communication apparatus, the image data operations including at least image data transmission, image data receiving, image data storing, image data reading, image data printing operations and an image data relaying operation;

a stop designator for instructing said operation controller to stop one of the image data operations concurrently in progress when said stop designator is actuated; and prohibiting means, cooperating with said operation controller and said stop designator, for preventing the image data relaying operation from being stopped by said stop designator.

7. A communication apparatus according to claim 6, wherein said operation controller is connected to a plurality of communication channels.

8. A communication apparatus according to claim 7, wherein said operating controller is constructed such that, while one of the operations using one channel is in progress, another of the operations using another channel also can be in progress.

9. A communication apparatus according to claim 8, wherein the construction and arrangement of said operation controller and said stop designator is such that all operations are stopped, except the relaying operation, when said stop designator instructs said operation controller to stop.

10. A communicating apparatus according to claim 6, further comprising a prohibition designator, operable by an operator, for presetting, in said operation controller, another kind of operation to be prohibited from stopping.

11. A method of controlling an image data communication device for performing image data transmission to communication lines, image data receiving from communication lines, image data reading, image data storing and image data printing operations, comprising the steps of:

concurrently executing a plurality of image data operations among the image data transmission, image data receiving, image data storing, image data reading and image data printing operations of the image data communication device;

instructing the communication device to stop one of the plurality of image data operations being concurrently executed when the stop instruction is given, without manually specifying which of the image data operations is to be stopped; and automatically selecting the one image data operation to be stopped when said instructing step is performed, and stopping of the one image data operation in response to performance of said instructing step, wherein the one image data operation is selected according to a predetermined stop priority, and wherein an operator presets the stop priority.

12. A method according to claim 11, wherein, in said selecting step, an operator is requested to confirm the identity of the operation to be stopped, and wherein the operation is stopped after the operator provides confirmation.

13. A method according to claim 11, wherein, responsive to stoppage of the operation selected to be stopped, an operator is informed of the identity of the operation which has just been stopped.

14. A method of controlling an image data communication device for performing image data transmission to communication channels, image data receiving from communication channels, image data reading, image data storing and image data printing operations, comprising the steps of:

connecting the image data communication device to a plurality of communication channels;

concurrently executing a plurality of image data operations among the image data transmission, image data receiving, image data storing, image data reading and image data printing operations of the image data communication device, a first image data operation using one communication channel and a second image data operation using another data channel;

instructing the communication device to stop one of the plurality of image data operations being concurrently executed when the stop instruction is given, without manually specifying which of the image data operations is to be stopped; and automatically selecting the one image data operation to be stopped when said instructing step is performed, and stopping of the one image data operation in response to performance of said instructing step such that when the one image data operation has been started later than another, the one image data operation is selected to be stopped, wherein said selecting step is performed by an operation controller connected to the plurality of communication channels.

15. A method according to claim 14, further comprising the step of displaying an indication of which of the communication channels are in use when stopping of an operation is instructed in said instructing step, and the step of designating a communication channel whose operation is to be stopped, from among the communication channels in use.

16. A method for controlling an image data communicating apparatus for performing image data transmission to communication lines, image data receiving from communication lines, image data reading, image data storing and image data printing operations, comprising the steps of:

concurrently executing a plurality of kinds of image data operations of the image data communication apparatus, the image data operations including image data transmission, image data receiving, image data storing, image data reading, image data printing operations and an image data relay operation;

instructing the apparatus to stop one of the image data operations concurrently in progress when the stop instruction is given; and preventing the image data relaying operation from being stopped by said instructing step.

17. A method according to claim 16, wherein said preventing step is performed by an operation controller connected to a plurality of communication channels.

18. A method according to claim 17, wherein said operation controller is such that, while one of the operations using one channel is in progress, another of the operations using another channel can also be in progress.

19. A method according to claim 18, wherein all operations are stopped, except the relaying operations, responsive to performance of said instructing step.

20. A method according to claim 16, further comprising the step, performed by an operator, of presetting another kind of operation to be prohibited from stopping.

21. An image data communicating apparatus for performing image data transmission to communication lines, image data receiving from communication lines, image data reading, image data storing and image data printing operations, comprising:

an operation controller for concurrently executing a plurality of image data operations of the image data communication apparatus, the image data operations including image data transmission, image data receiving, image data storing, image data reading, image data printing, a local image data copying operation and an image data communication operation with another station;

a stop designator for instructing said operation controller to stop one of said plurality of image data operations being concurrently executed when said stop designator is actuated without manually specifying the image data operation to be stopped; and a stop controller for automatically selecting the one image data operation to be stopped when said stop designator is actuated, said stop controller cooperating with said operation controller and said stop designator to stop the one image data operation, wherein when said stop designator is actuated while the local image data copying operation and the image data communication operation are concurrently executed, the local image data copying operation is stopped.

22. A method of controlling an image data communication device for performing image data transmission to communication lines, image data receiving from communication lines, image data reading, image data storing and image data printing operations, comprising the steps of:

concurrently executing a plurality of image data operations of the image data communication device, the image data operations including image data transmission, image data receiving, image data storing, image data reading, image data printing, a local image data copying operation and an image data communication operation with another station;

instructing the image data communication device to stop one of the plurality of the image data operations being concurrently executed when the stop instruction is given, without manually specifying which of the image data operations is to be stopped; and automatically selecting the one image data operation to be stopped when said instructing step is performed, and stopping the one image data operation, wherein the local image data copying operation is selected to be stopped when the local image data copying operation and the image data communication operation are being concurrently executed.

23. An image data communicating apparatus for performing image data communication comprising:

operation controlling means for concurrently executing a plurality of image data operations of the image data communication apparatus, the image data operations including a local image data processing operation and an image data communication operation with another station;

stop designation means for instructing said operation controlling means to stop one of the local image data processing and image data communication operations being concurrently executed when said stop designation means is actuated without manually specifying the image data operation to be stopped; and stop controlling means for automatically selecting the one image data operation to be stopped in response to actuation of said stop designation means, wherein when said stop designation means is actuated while the local image data processing operation and the image data communication operation are concurrently executed, the local image data processing operation is stopped.

24. An apparatus according to claim 23, wherein the data operations further including data transmission, data receiving, data storing, data reading and data printing.

25. An apparatus according to claim 23, wherein the local data processing operation is one of data storing, data copying and data printing operations.

26. An apparatus according to claim 23, wherein the local data processing operation is a local image copying operation.

27. A method of controlling an image data communication device for performing image data communication, comprising the steps of:

concurrently executing a plurality of image data operations of the image data communication device, the image data operations including a local image data processing operation and an image data communication operation with another station;

instructing the image data communication device to stop one of the plurality of image data operations being concurrently executed when the stop instruction is given, without manually specifying which of the image data operations is to be stopped; and automatically selecting the one image data operation to be stopped, and stopping the one image data operation, wherein the local image data processing operation is selected to be stopped when the local image data processing operation and the image data communication operation are being concurrently executed.

28. A method according to claim 27, wherein the data operations further including data transmission, data receiving, data storing, data recording and data printing.

29. A method according to claim 27, wherein the local data processing operation is one of data storing, data copying and data printing operations.

30. A method according to claim 27, wherein the local data processing operation is a local image copying operation.

* * * * *

UNITED STATES PATENT AND TRADEMARK OFFICE
CERTIFICATE OF CORRECTION

PATENT NO. : 5,489,895

DATED : February 6, 1996

INVENTOR : TOMOYUKI HAGANUMA

It is certified that error appears in the above-identified patent and that said Letters Patent is hereby corrected as shown below:

COLUMN 1

Line 42, "a-stop" should read --a stop--;
   Line 44, "Stop" should read --stop--;
   Line 64, "DRAWING" should read --DRAWINGS--.

COLUMN 2

Line 21, "or" should read --of--;
   Line 65, ".the" should read --the--.

COLUMN 3

Line 39, "(84)." should read --(S4).--;
   Line 55, "step 11," should read --step S11,--.

COLUMN 4

Line 6, "(817)," should read --(S17),--;
   Line 30, "FIG.3.Fig.8" should read --FIG. 3. ¶ FIG. 8--;
   Line 32, "step 85" should read --step S5--;
   Line 46, "operation" should read --operation which--.

UNITED STATES PATENT AND TRADEMARK OFFICE
CERTIFICATE OF CORRECTION

PATENT NO. : 5,489,895

DATED : February 6, 1996

INVENTOR : TOMOYUKI HAGANUMA

It is certified that error appears in the above-identified patent and that said Letters Patent is hereby corrected as shown below:

COLUMN 5

```
Line 6,   "step 853" should read --step S53--;
Line 39,  "6a." should read --6a--;
Line 41,  "respectfully," should read --respectively,--;
Line 42,  "In-this" should read --In this--.
```

COLUMN 6

```
Line 35,  "to-be" should read --to be--.
```

COLUMN 7

```
Line 2,   "817'" should read --S17'--;
Line 8,   "which" should read --while--;
Line 12,  "operations" should read --operation--;
Line 18,  "therefore" should be deleted.
```

COLUMN 8

```
Line 46,  "operating" should read --operation--;
Line 55,  "communicating" should read --communication--.
```

UNITED STATES PATENT AND TRADEMARK OFFICE
CERTIFICATE OF CORRECTION

PATENT NO.  : 5,489,895

DATED       : February 6, 1996

INVENTOR    : TOMOYUKI HAGANUMA

It is certified that error appears in the above-identified patent and that said Letters Patent is hereby corrected as shown below:

<u>COLUMN 9</u>

Line 67,   "communication" should read --communicating--.

<u>COLUMN 10</u>

Line 30,   "communication" should read --communicating--.

<u>COLUMN 11</u>

Line 12,   "communication" should read --communicating--;
   Line 32,   "including" should read --includes--.

<u>COLUMN 12</u>

Line 26,   "including" should read --includes--.

Signed and Sealed this

Ninth Day of July, 1996

Attest:

BRUCE LEHMAN

Attesting Officer

Commissioner of Patents and Trademarks